United States Patent [19]
Wilkinson et al.

[11] Patent Number: 5,392,341
[45] Date of Patent: Feb. 21, 1995

[54] AUTOMATIC TELEPHONE LINE MONITORING AND SELECTION APPARATUS AND METHOD

[76] Inventors: Charles L. Wilkinson, 412 Lee Rd., Cottontown, Tenn. 37048; Roberto Schipp, 4508 Price Circle Rd., Nashville, Tenn. 37205

[21] Appl. No.: 898,090

[22] Filed: Jun. 11, 1992

[51] Int. Cl.6 .................................................. H04M 3/00
[52] U.S. Cl. .................................. 379/210; 379/165; 379/214; 379/231; 379/201
[58] Field of Search ................ 379/201, 210, 211, 212, 379/264, 157, 165, 214, 231, 232

[56] References Cited

U.S. PATENT DOCUMENTS

| | | | |
|---|---|---|---|
| 3,571,517 | 3/1971 | Joel, Jr. ................... | 179/18 |
| 4,066,847 | 7/1978 | Giordano ................. | 179/99 |
| 4,408,100 | 10/1983 | Pritz et al. ............... | 179/27 |
| 4,599,493 | 7/1986 | Cave ......................... | 179/18 |
| 4,629,831 | 12/1986 | Curtis et al. ............. | 379/213 |
| 4,791,666 | 12/1988 | Cobb et al. ............... | 379/213 |
| 4,813,070 | 3/1989 | Humphreys et al. ..... | 379/213 |
| 4,885,769 | 12/1989 | Beierle ...................... | 379/210 |
| 4,959,856 | 9/1990 | Bischoff .................... | 279/245 |
| 5,036,535 | 7/1991 | Gechter .................... | 379/210 |
| 5,056,135 | 10/1991 | Ahn ............................ | 379/252 |

Primary Examiner—James L. Dwyer
Assistant Examiner—Michael N. Lau
Attorney, Agent, or Firm—Mark J. Patterson; Edward D. Lanquist, Jr.; I. C. Waddey, Jr.

[57] ABSTRACT

An automatic telephone line call monitoring and line assignment device is installed at a subscriber location to assign incoming calls on a master ringing line to a user selected slave line in response to taking that line off-hook. A programmable logic unit detects incoming calls, off-hook lines, and directs the device to automatically dial a central office call intercept service to move incoming calls off the master line to the slave lines.

5 Claims, 13 Drawing Sheets

| | |
|---|---|
| STRING STATE 0 | '( /Q4 * /Q3 * /Q2 * /Q1 * /Q )' |
| STRING STATE 1 | '( /Q4 * /Q3 * /Q2 * /Q1 * /Q )' |
| STRING STATE 2 | '( /Q4 * /Q3 * /Q2 * /Q1 * /Q )' |
| STRING STATE 3 | '( /Q4 * /Q3 * /Q2 * /Q1 * /Q )' |
| STRING STATE 4 | '( /Q4 * /Q3 * /Q2 * /Q1 * /Q )' |
| STRING STATE 5 | '( /Q4 * /Q3 * /Q2 * /Q1 * /Q )' |
| STRING STATE 6 | '( /Q4 * /Q3 * /Q2 * /Q1 * /Q )' |
| STRING STATE 7 | '( /Q4 * /Q3 * /Q2 * /Q1 * /Q )' |
| STRING STATE 8 | '( /Q4 * /Q3 * /Q2 * /Q1 * /Q )' |
| STRING STATE 9 | '( /Q4 * /Q3 * /Q2 * /Q1 * /Q )' |
| STRING STATE 10 | '( /Q4 * /Q3 * /Q2 * /Q1 * /Q )' |
| STRING STATE 11 | '( /Q4 * /Q3 * /Q2 * /Q1 * /Q )' |
| STRING STATE 12 | '( /Q4 * /Q3 * /Q2 * /Q1 * /Q )' |
| STRING STATE 13 | '( /Q4 * /Q3 * /Q2 * /Q1 * /Q )' |
| STRING STATE 14 | '( /Q4 * /Q3 * /Q2 * /Q1 * /Q )' |
| STRING STATE 15 | '( /Q4 * /Q3 * /Q2 * /Q1 * /Q )' |
| STRING STATE 16 | '( /Q4 * /Q3 * /Q2 * /Q1 * /Q )' |
| STRING STATE 17 | '( /Q4 * /Q3 * /Q2 * /Q1 * /Q )' |
| STRING STATE 18 | '( /Q4 * /Q3 * /Q2 * /Q1 * /Q )' |
| STRING STATE 19 | '( /Q4 * /Q3 * /Q2 * /Q1 * /Q )' |
| STRING STATE 20 | '( /Q4 * /Q3 * /Q2 * /Q1 * /Q )' |
| STRING STATE 21 | '( /Q4 * /Q3 * /Q2 * /Q1 * /Q )' |
| STRING STATE 22 | '( /Q4 * /Q3 * /Q2 * /Q1 * /Q )' |
| STRING STATE 23 | '( /Q4 * /Q3 * /Q2 * /Q1 * /Q )' |
| STRING STATE 24 | '( /Q4 * /Q3 * /Q2 * /Q1 * /Q )' |
| STRING STATE 25 | '( /Q4 * /Q3 * /Q2 * /Q1 * /Q )' |
| STRING STATE 26 | '( /Q4 * /Q3 * /Q2 * /Q1 * /Q )' |
| STRING STATE 27 | '( /Q4 * /Q3 * /Q2 * /Q1 * /Q )' |
| STRING STATE 28 | '( /Q4 * /Q3 * /Q2 * /Q1 * /Q )' |
| STRING STATE 29 | '( /Q4 * /Q3 * /Q2 * /Q1 * /Q )' |
| STRING STATE 30 | '( /Q4 * /Q3 * /Q2 * /Q1 * /Q )' |
| STRING STATE 31 | '( /Q4 * /Q3 * /Q2 * /Q1 * /Q )' |
| STRING ALLBUSY | '( BUSY 1 * BUSY 2 * BUSY 3 )' |

*FIG. 11*

EQUATIONS

```
COUNT  = STATE 0  * / TIMER  *  HOLD * /RINGTIM  ; HOLD is the trigger
       + STATE 1  * / TIMER               ; each successive count is initiated when
       + STATE 2  * / TIMER               ; the timer goes low again, i.e. after 57ms
       + STATE 3  * / TIMER
       + STATE 4  * / TIMER
       + STATE 5  * / TIMER
       + STATE 6  * / TIMER
       + STATE 7  * / TIMER
       + STATE 8  * / TIMER
       + STATE 9  * / TIMER
       + STATE 10 * / TIMER
       + STATE 11 * / TIMER
       + STATE 12 * / TIMER
       + STATE 13 * / TIMER
       + STATE 14 * / TIMER
       + STATE 15 * / TIMER
       + STATE 16 * / TIMER
       + STATE 17 * / TIMER
       + STATE 18 * / TIMER
       + STATE 19 * / TIMER
       + STATE 20 * / TIMER
       + STATE 21 * / TIMER
       + STATE 22 * / TIMER
       + STATE 23 * / TIMER
       + STATE 24 * / TIMER
       + STATE 25 * / TIMER
       + STATE 26 * / TIMER
       + STATE 27 * / TIMER
       + STATE 28 * / TIMER
       + STATE 29 * / TIMER
       + STATE 30 * / TIMER   ; counter is stopped by DISCHAR
       + STATE 31 * / TIMER DATA  = STATE 16              ; preload DTMF generator with "*", DATA=D0=D1=
      + STATE 17              ; else DTMF generator sees "8"; DATA=D0=D1=0

DAILEN = STATE17 *  TIMER     ; dial first digit 850ms after COUNT starts
       + STATE19  *  TIMER    ; dial second digit (STATE16 is interdigit )

; dialing is completed after this state

/DISCHAR = STATE 24           ; reset board

OFFHOOK = 1                   ; disabled on this PAL version

/HOLD1 = HOLD                 ; invert signal only

RSTHI = / PWRUP               ; resets 'LS93 upon power up
      + / RESET               ; follow reset board
```

*FIG. 12*

AUTOMATIC TELEPHONE LINE MONITORING AND SELECTION APPARATUS AND METHOD

BACKGROUND OF THE INVENTION

The present invention relates generally to the monitoring of incoming telephone calls and selection of available telephone subscriber lines, and more particularly to a method and apparatus for detecting incoming telephone calls to a published telephone number and monitoring available customer lines, for subsequent re-assignment of a detected call, using a central office call intercept service.

It is well known in tile prior art that efficient business telephone communications requires an incoming call arrangement that uses multiple incoming telephone lines to minimize the possibility of a customer call going unanswered. At the same time, it is preferred that such an arrangement allow all incoming calls to be answered at a central location within the business using a consolidated call signaling arrangement. For many businesses, the solution has been to lease multiple incoming lines and numbers from the local telephone company, publish one incoming number, then subscribe to a "line-hunt" service. Using such a service, the phone company's central office provides a system that detects an incoming call to the published number, then "hunts" the subscriber's multiple lines and rolls the call over to one that is available to receive the call. Unfortunately, such a line-hunt service is expensive to the customer, who incurs a substantial monthly, per line, premium charge on his telephone bill.

More recently, some local telephone companies have offered an additional central office feature to businesses having a need for a line-hunt type service by wishing to avoid the corresponding expense. With this service, sometimes called "Bell Prestige Service" and offered, for example, by South Central Bell Telephone Company, all incoming calls to the subscriber are monitored at the central office. When an incoming call is detected, a single ringing or master line at the subscriber's office is activated. The phone operator at the subscriber's office visually looks for an available line, then selects that line and dials a touch tone code back to the central lo office. Upon receipt of this code, the central office system moves the incoming call off of the master line and onto to tile selected idle line.

The primary problem with this conventional Prestige idle line selection system is that it requires a constant and active human intervention at the subscriber's location, both to look for and select an idle line and to send the appropriate intercept code back to the central office. Many businesses are not in a position or do not prefer to consistently commit human resources to such a method.

What is needed, then, is a multiple telephone line apparatus and system that automatically, and without human intervention, routes all incoming calls made to a published telephone line to an available incoming line, anti does so without the use of expensive central office installed and controlled hardware and systems. This device is presently lacking in the prior art.

SUMMARY OF THE INVENTION

In the present invention, a telephone line interface and control apparatus is installed at the subscriber's offices and is connected both to an incoming master line and up to eight additional incoming slave lines. The apparatus constantly looks for and detects an incoming ring signal on the master line, generated by the central office. When a user at the subscriber's office hears tile incoming ring, he/she picks up any available slave line on a local telephone set. The apparatus detects the pick-up of the idle slave line and transfers the incoming call to that line. It then dials and sends a predetermined and programmed intercept code to tile central office Prestige service, moving the incoming call off of the master line. Additional hardware in the apparatus will busy-off tile master line when all slave lines are in use.

BRIEF DESCRIPTION OF THE DRAWINGS

FIG. 11 shows tile sequence of states established in the logic unit, as established counted by the state counter, as a function of tile data string inputs (Q0, Q1, Q2, Q3 and Q4 from the state counter and BUSY1, BUSY2, and BUSY3 from tile line status unit).

FIG. 12 shows the sequence of algorithmic equations programmed in conventional fashion and performed in tile logic unit at each state sequenced by the state counter.

DESCRIPTION OF THE PREFERRED EMBODIMENT

Figure 1:
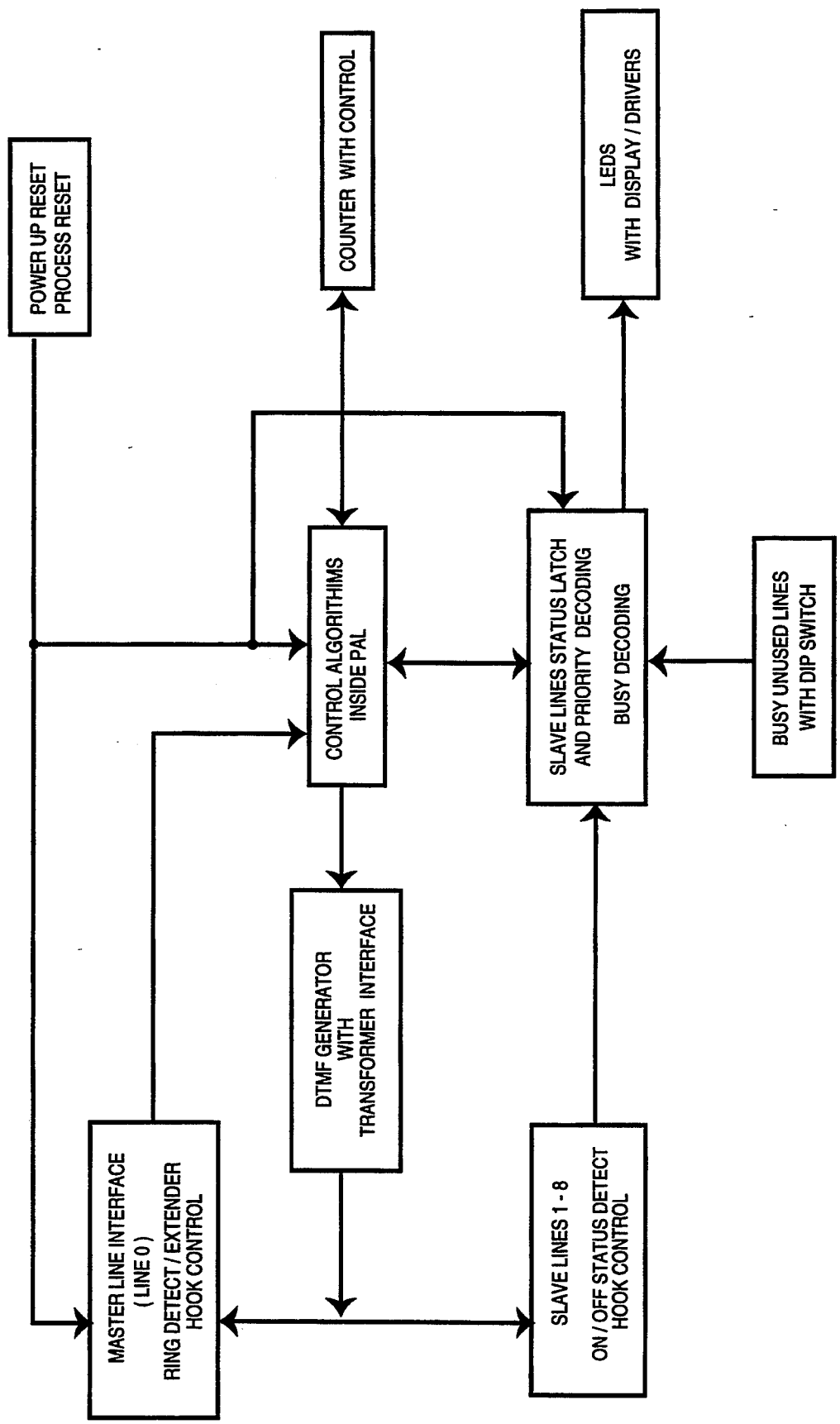
FIG. 1 is a block diagram showing the basic line interface, status, control/dialer, and display/reset units of the apparatus of the present invention.
Figure 2:
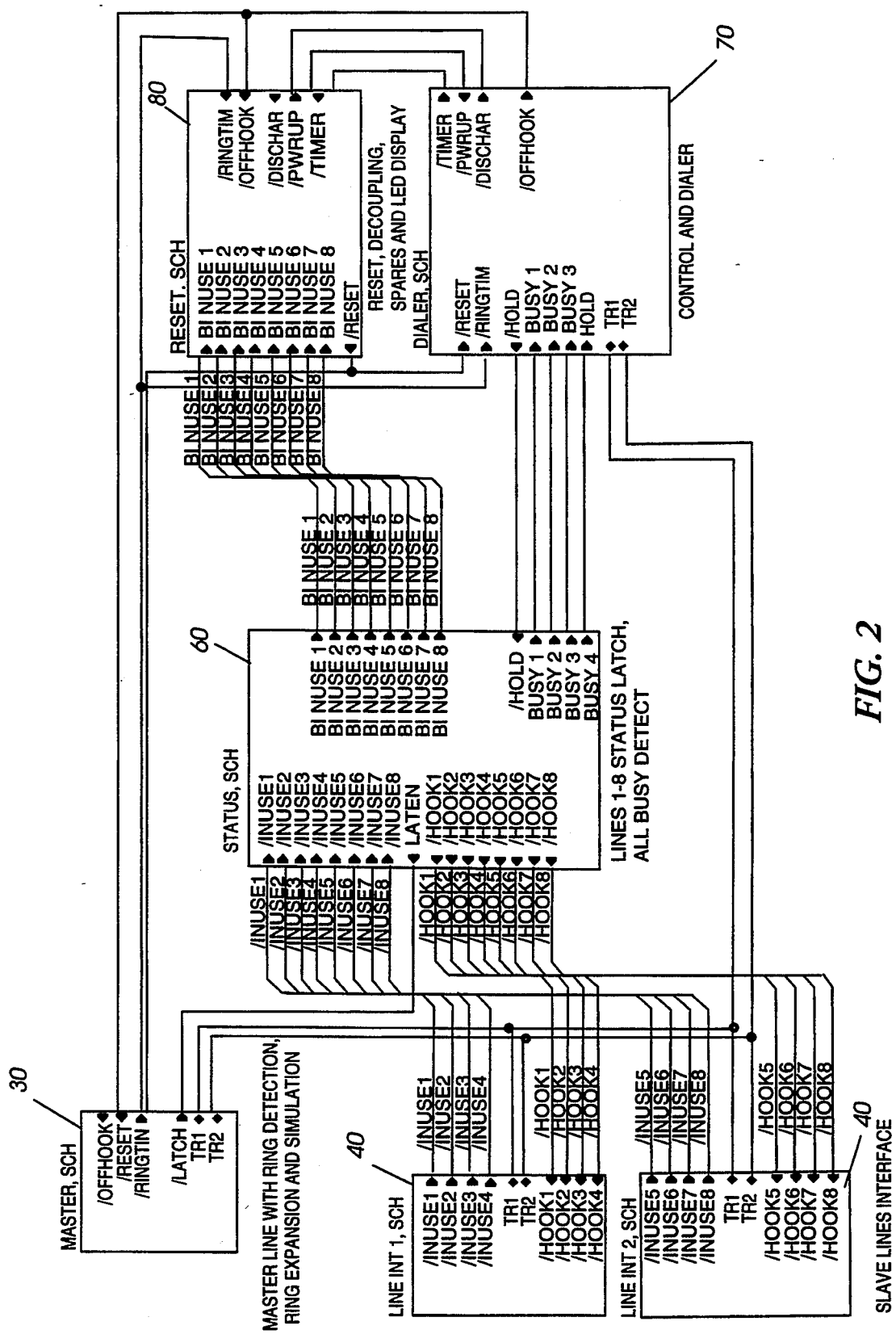
FIG. 2 is a block diagram showing the basic wiring interconnections among the master line interface, slave line interface, line status, control/dialer, and display/reset units of the apparatus of the present invention.

In FIGS. 1 and 2, the basic logical and hardwired interconnections between the various functional units of the apparatus of the present invention can be seen.

FIG. 1 is a general block diagram of the apparatus of the present invention. The various operational blocks shown on FIG. 1 include POWER-UP RESET/PROCESS RESET block which is illustrated in more detail on FIG. 8 and operationally connected to the CONTROL ALGORITHMS block (illustrated in detail in FIG. 7), the SLAVE LINE STATUS block (illustrated in detail in FIG. 6), and the MASTER LINE INTERFACE BLOCK (illustrated in detail in FIG. 3). A DIP SWITCH block, illustrated in more detail on FIG. 6 as slave line disable switch 62, is shown operatively connected to the SLAVE LINE STATUS block, for purposes of manually disabling selected slave lines at the subscriber location.

Figure 7:
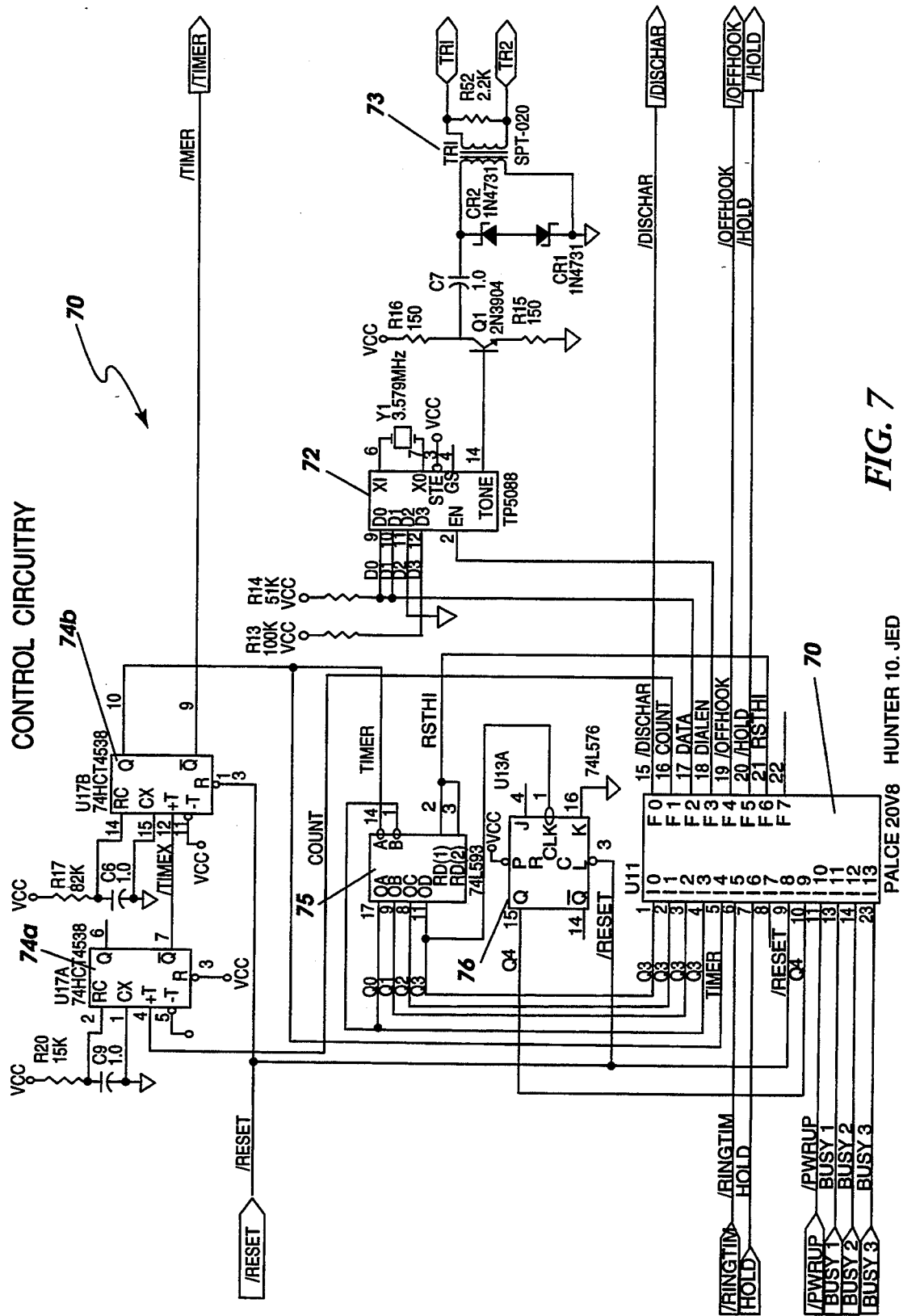
FIG. 7 is a schematic diagram of the circuitry of the control/dialer unit of the apparatus of the present invention.

FIG. 1 also shows an operational connection between the CONTROL ALGORITHMS block and the DTMF GENERATOR block which, as shown on FIG. 7 as dialer 72, generates appropriate pre-programmed signalling tones for sending to the central office through a transformer interface. The CONTROL ALGORITHMS block also communicates with a COUNTER WITH CONTROL block, corresponding to timers 74a and 74b, counter 75, and state counter flip-flop 76 of FIG. 7. The SLAVE LINES STATUS block provides visual status indicating signals to LEDS block, illustrated in more detail on FIG. 8, and receives signals from the SLAVE LINES 1-8 block, which corresponds to the slave line interface units 40a–h of FIG.'s 4a and 4b.

FIG. 2 shows schematically the interconnection of the logic signal inputs and outputs between and among master line interface unit 30, slave line interface unit 40, line status unit 60, control/dialer unit 70, and display/reset unit 80. The signals generated on the various signal lines shown on FIG. 2 are discussed in detail below, with their respective timing relationships shown on FIG. 10 and pre-programmed algorithmic relationships shown on FIG. 12.

Figure 3:
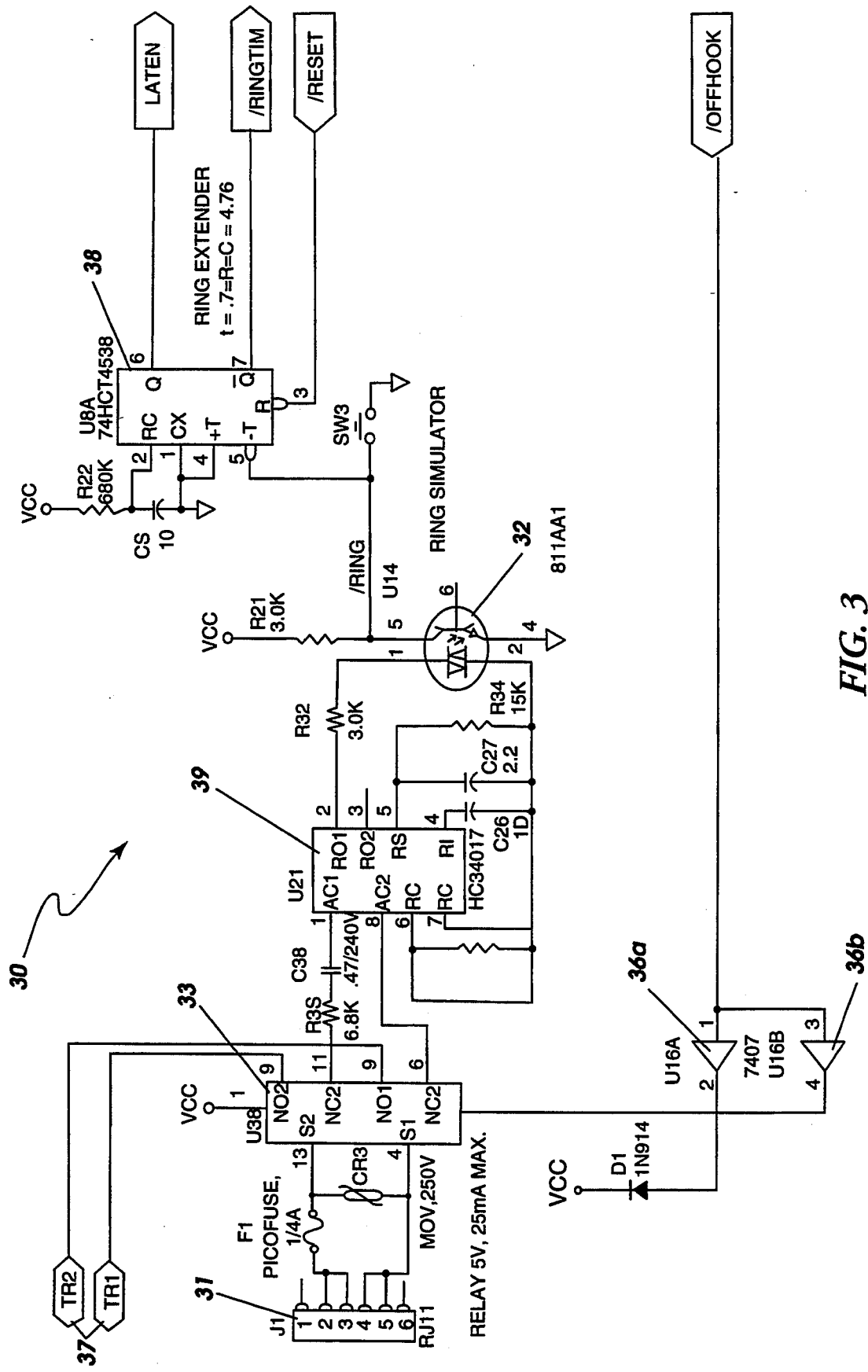
FIG. 3 is a schematic diagram of the circuitry of the master line interface unit of the apparatus of the present invention.

Looking now at FIG. 3, the circuitry of master line interface unit 30 is shown. Interface unit 30 includes generally a master line interface connector 31 which preferably is a conventional RJ11 device which is electrically connected to the tip and ring signal lines (51t and 51r on FIG. 5) of both the central office incoming line and subscriber incoming line. This connection is accomplished by means of a cable assembly (jack 56 and plug 55) and interrupting line interconnect 52, also shown on FIG. 5. Interface connector 31 is electrically connected to ring detector 39 when the contacts of master line relay 33 are in their normally closed condition. Accordingly, an incoming master line ring signal is electrically transmitted to ring detector 39 from which it is then optically coupled, through opto-isolator 32, to ring extender/timer 38. Relay drivers 36a and 36b are also electrically connected to master line relay 33 such that a special signal (/OFFHOOK on FIGS. 3 and 7) from logic unit 71 will disable incoming calls when all slave lines are in use and until one of the slave lines becomes available.

Figure 4A:
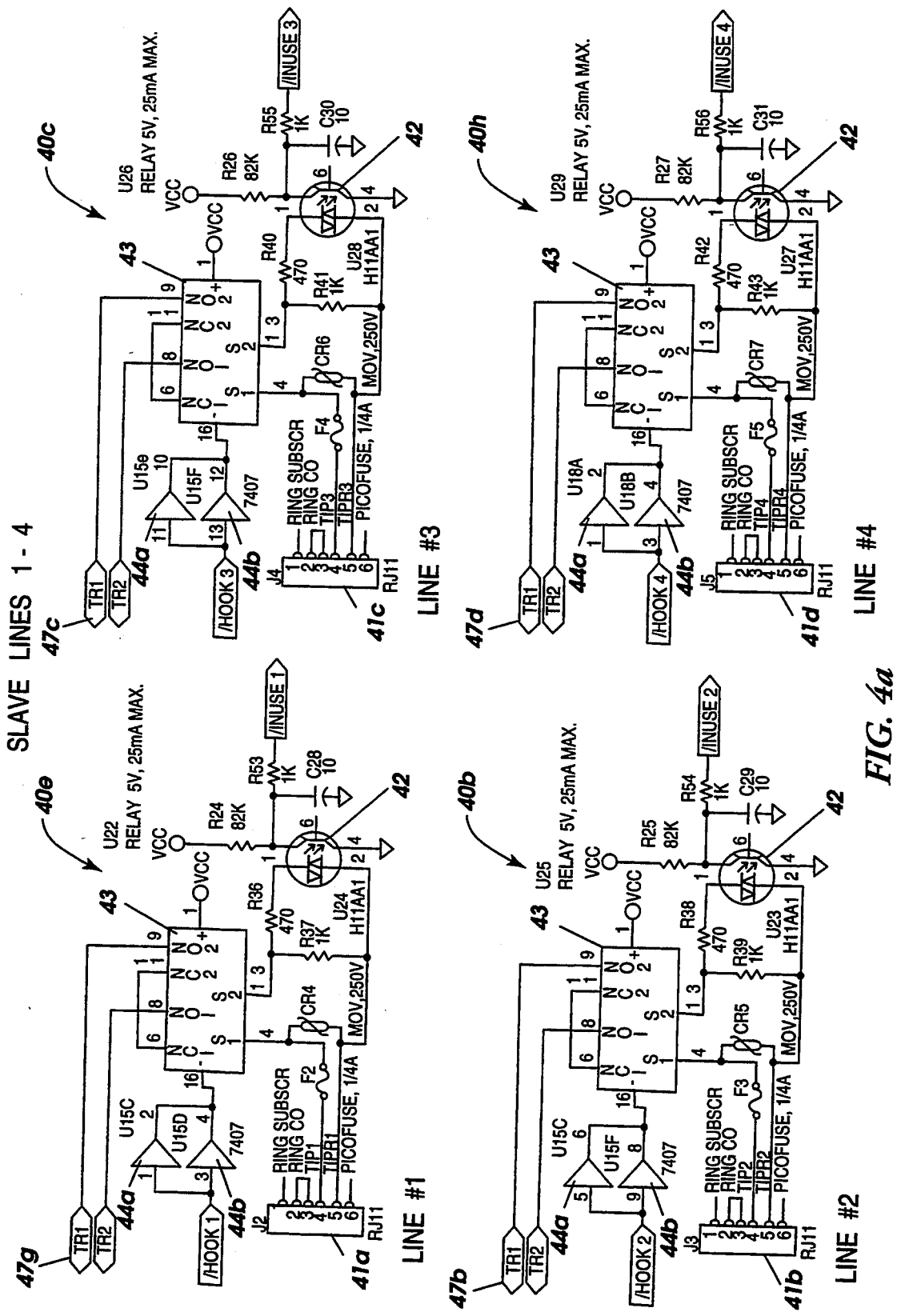
FIGS. 4a and 4b are schematic diagrams showing the circuitry of the slave line interface unit of the apparatus of the present invention.
Figure 4B:
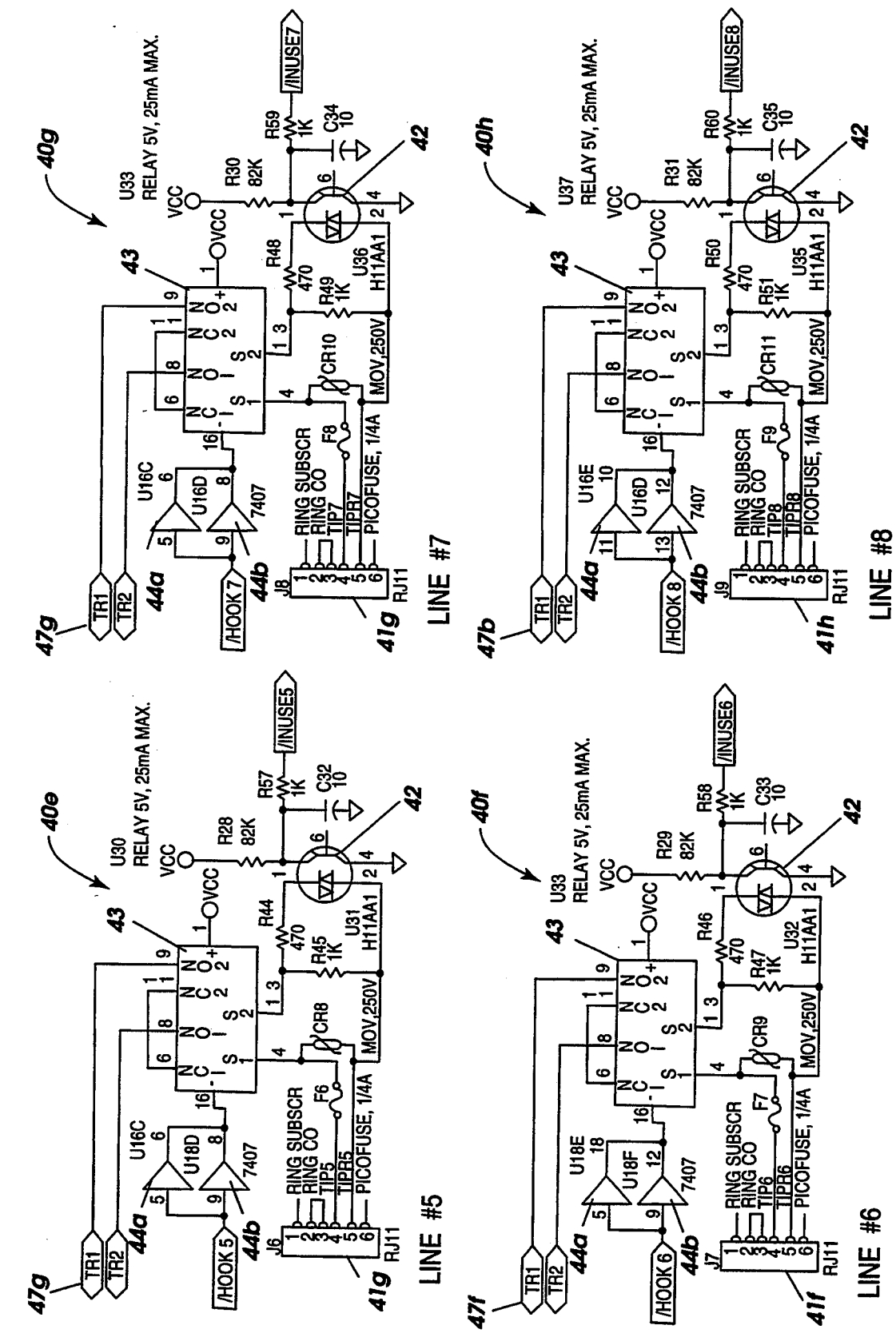

Looking now at FIGS. 4a and 4b, the circuitry or slave line interface unit 40 is shown. Interface unit 40 includes, in a preferred embodiment, up to eight identical slave line interface circuits 40a–h, each having a slave line interface connector 41 which preferably will be an RJ11 device connected to the tip and ring signal lines of eight corresponding subscriber phone lines. An/INUSE signal is generated through opto-isolator 42 when the slave line is in use, which is used by line status unit 60 (FIG. 6) for purposes of generating a HOLD signal to logic unit 71 (FIG. 7) and an/HOOK signal to relay 43 through relay drivers 44a and 44b. Relay 43 is closed when the/HOOK signal is received, thereby connecting the incoming line signals to the corresponding slave line. Relay 43 communicates electrically with dialer unit 72 through the secondary of transformer 73 (FIG. 7) by means of signal lines 47a–h.

Figure 5:
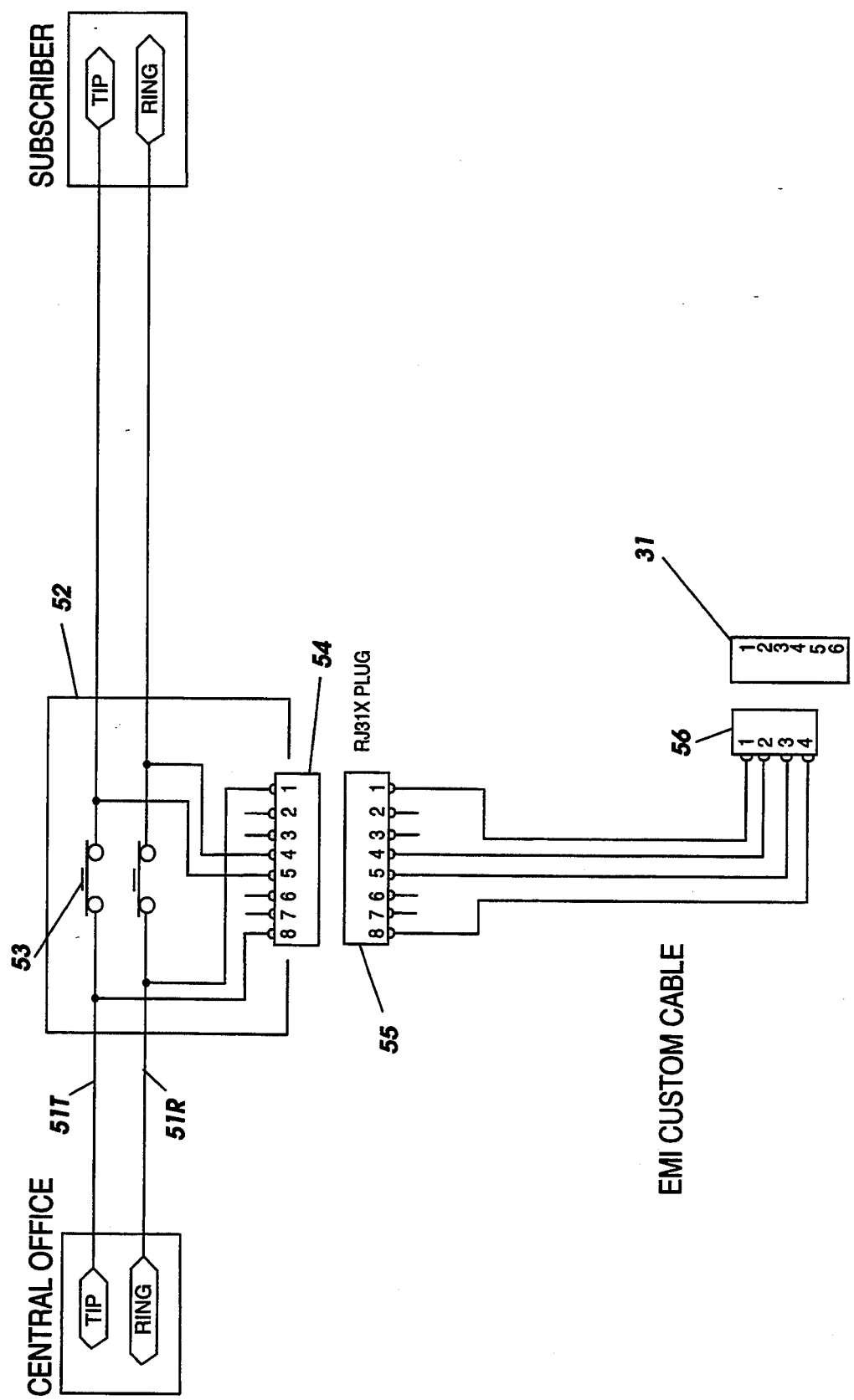
FIG. 5 is a schematic diagram showing the interconnection between the line interlace units of the apparatus of tile present invention and incoming telephone lines.

FIG. 5 shows the manner of connecting both master line interface unit 30 and slave line interface unit 40 to a conventional tip and ring telephone line, 51t and 51r, connected between the local telephone company's central office and the subscriber location. Line interconnect 52, including shorting bars 53 and interconnect jack 54, are connected to the respective tip and ring wires of incoming line 51. Interconnect plug 55 is plugged into interconnect jack 54, removing shorting bars 53 from the circuit. Interconnect plug 55 is hardwired to interface jack 56 which is then conventionally connected to corresponding master line interface connector 31.

Figure 6:
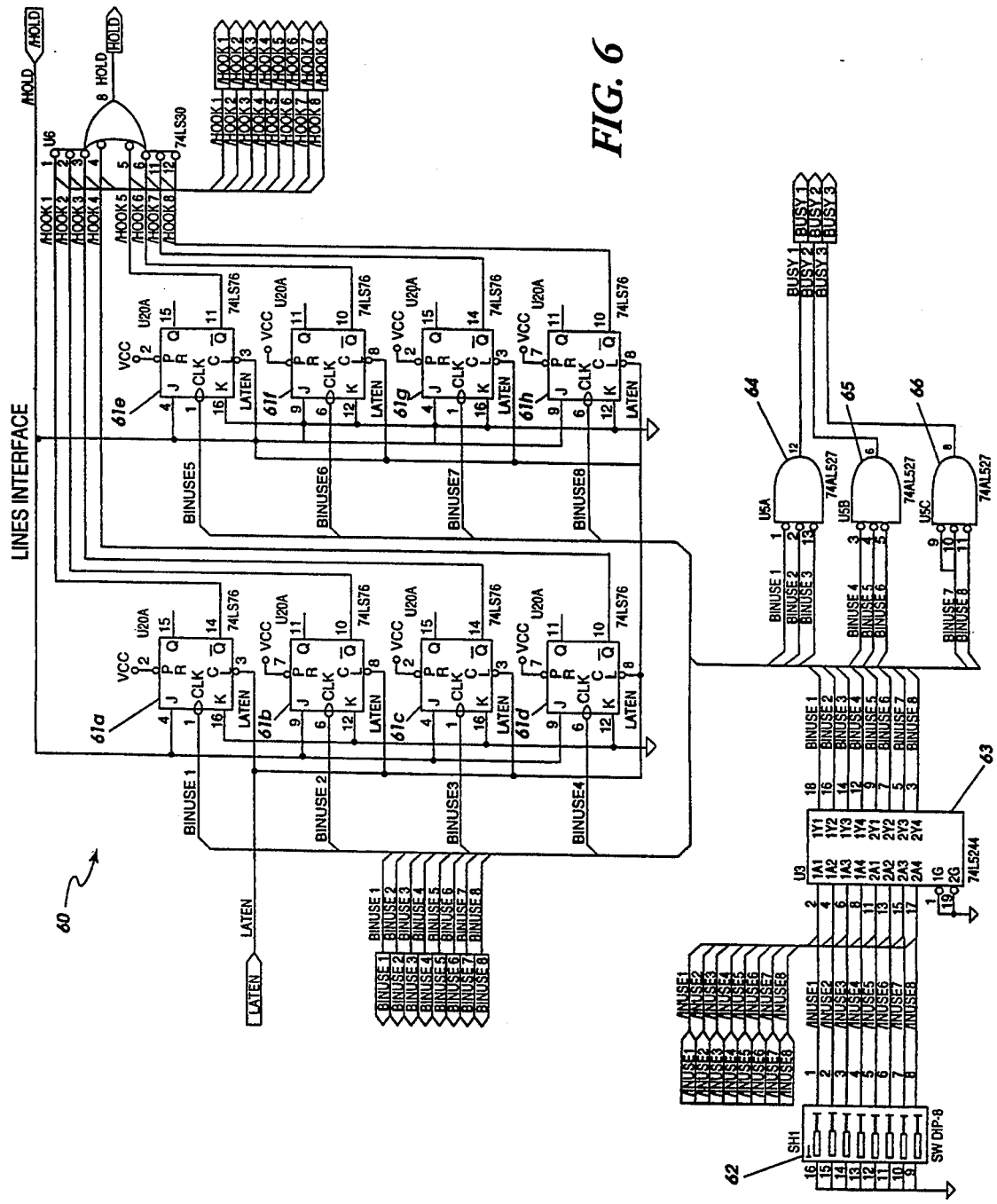
FIG. 6 is a schematic diagram showing the circuitry of tile line status unit of the apparatus of the present invention.

Looking now at FIG. 6, line status unit 60 of the apparatus of the present invention is shown. Status unit 60 includes line status flip-flops 61a–h, each corresponding to an incoming slave line 41a–h and to one of slave line interface unit circuits 40a–h, as shown on FIGS. 4a and 4b. /INUSE signals generated by slave line interface circuits 40 are buffered in buffer 63 before being electrically connected as/BINUSE signals to flip-flops 61./BINUSE signals are also hardwired to the inputs of first stage slave line busy detectors 64, 65, and 66, which are preferably "and" gates which generate corresponding/BUSY signals when each input signal is high, indicating that the corresponding slave lines are in use. The outputs of flip-flops 61a–h create corresponding/HOOK signals which are used by the slave line interface units 40a–h of FIGS. 4a and 4b, as described above. When any of the eight/ HOOK signals are on, as at the inputs to hold indicator gate 67, a HOLD signal is then generated at the output of or gate 67 and sent to logic unit 71, as shown on FIG. 7. This causes a pre-programmed sequence of events to occur, as shown on FIG. 10 and discussed below.

Looking now at FIG. 7, the circuitry of the control/-dialer unit 70 of the apparatus can be seen. Control/dialer unit 70 includes programmable logic unit 71 which is pre-programmed in a conventional fashion to implement each of the operations described herein and as shown particularly on FIGS. 9, 10, 11, and 12. The algorithms which are implemented by logic unit 71 are set forth in FIG. 12. A tone generating dialer 72 is controlled by logic unit 71 for the purpose of generating a special signal for transmission to the central office, which is used to move an incoming call off the master line to the selected slave line. A line coupling transformer 73 provides an appropriate electrical interface between dialer 72 and slave line interface units 40a–h. A state counter, which operatively incorporates state counter timers 74a and 74b, counter 75, and state counter flip-flop 76, generates the series of data strings shown on FIG. 11, corresponding to outputs Q0, Q1, Q2 and Q3 of counter 75 and Q4 of flip-flop 76.

Figure 8:
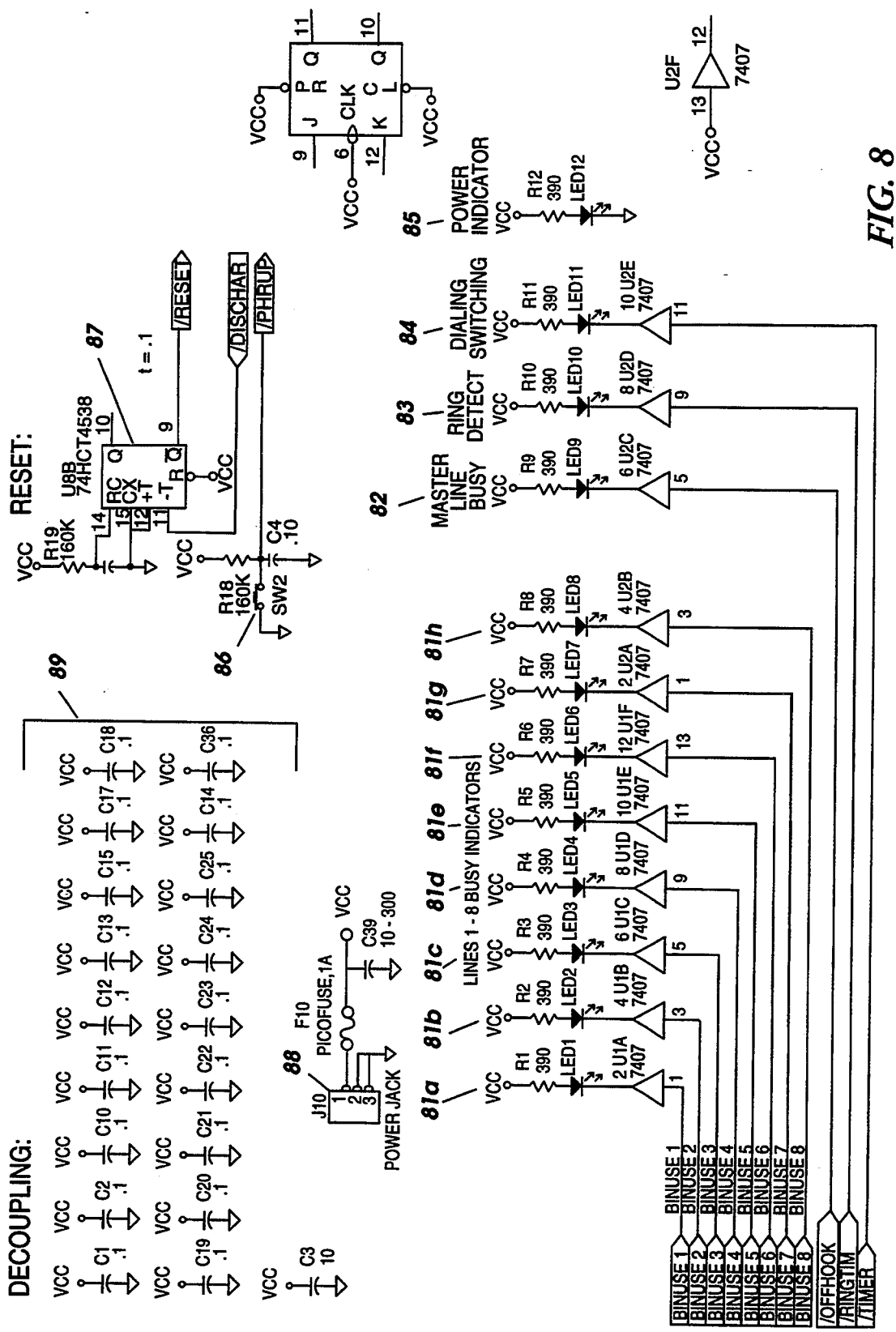
FIG. 8 is a schematic diagram of the circuitry of the display/reset unit of the apparatus of the present invention.

FIG. 8 shows the circuitry of the display/reset unit 80 of the apparatus of the present invention. Display/reset unit 80 includes slave line busy indicators 81a–h which are activated when corresponding/BINUSE signals are generated by slave line status unit 60 of FIG. 6. Master line busy indicator 82, ring detect indicator 83, and dialing/switching indicator 84 are activated by respective/OFFHOOK (from logic unit 71 on FIG. 7),/RINGTIM (from ring timer/extender 38 of FIG. 3), and/TIMER (from timer 74b of FIG. 7) signals. Power on indicator 85 is illuminated when the apparatus is energized. Display/reset unit 80 also includes power jack 88 to supply power to the apparatus, a manual reset switch 86, a reset timer 87 for purposes of generating a reset signal/RESET for use by control/dialer unit 70 (FIG. 7), and power supply capacitive de-coupling section 89.

Figure 9:
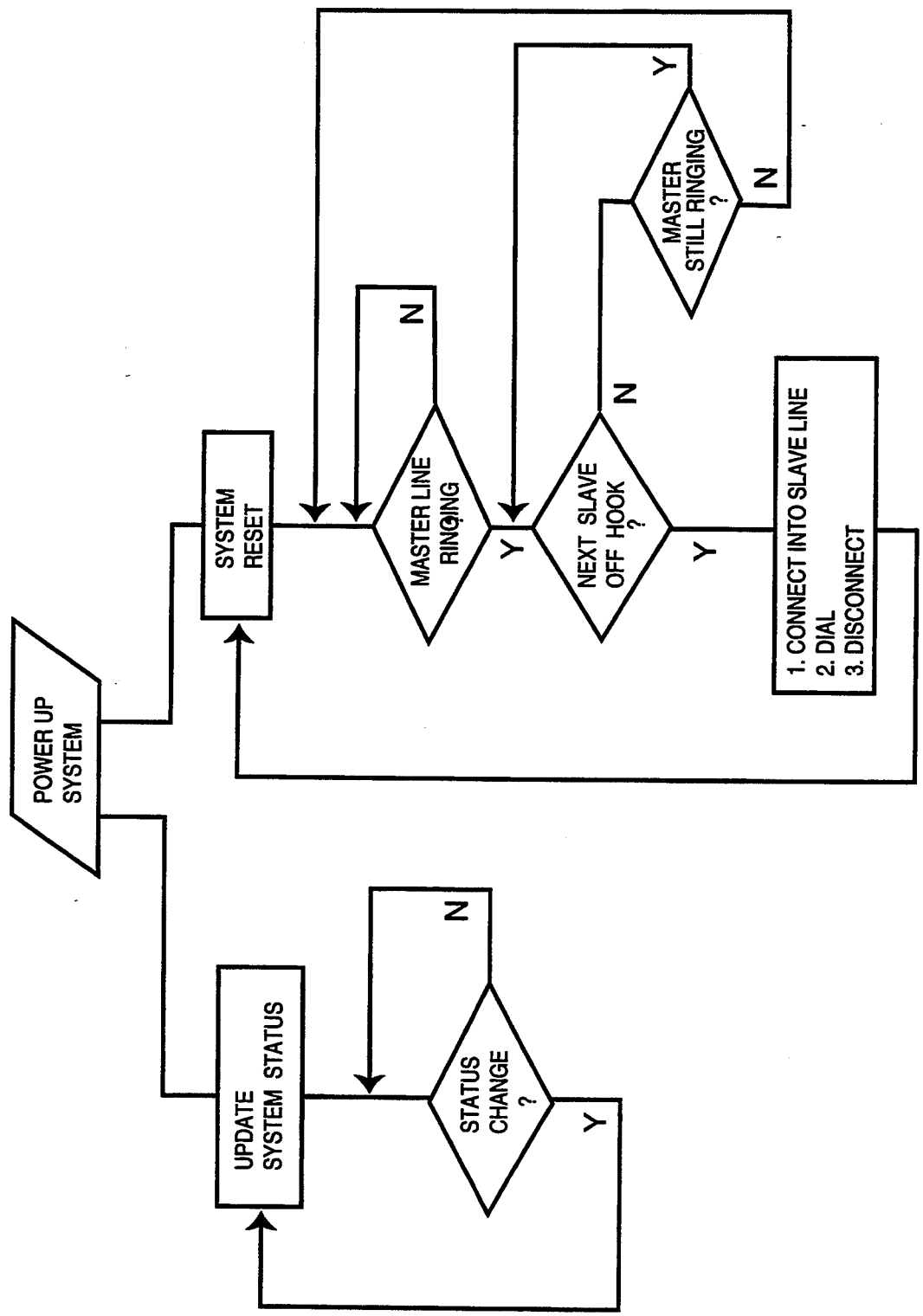
FIG. 9 is a flow-chart which diagrams the basic steps of the method of the present invention.

Having described the various operational blocks of the apparatus, the operation of the apparatus can now be understood. FIG. 9 sets forth the basic logical operations which occur after power up (/PHRUP signal from reset unit 80 on FIG. 8 and system reset (/RESET signal from reset timer 87 on FIG. 8). Once a ring is detected on the master line, by ring detector 39 on FIG. 3, the status of the next slave line is queried until the one that is selected at the subscriber location and therefore "off-hook" is identified. This off-hook line is then connected to the master line, the line switching code is generated by dialer 72 of FIG. 7 and sent to the central office. The central office Prestige or similar service decodes the incoming tone and moves the call off of the master line and on to the selected slave line.

Looking now at FIGS. 2–7 and 10–12, the operation of the apparatus and method of the present invention is described in more detail. The master line interface connector 31 and each of slave line interface connectors 41a–h are connected to conventional incoming telephone lines as shown on FIG. 5. Master line interface unit 30 is connected to the incoming line designated by the subscriber to the phone company central office as the published ringing line for that particular business. If any of the slave lines are unused, they can be manually disabled by means of slave line disable switch 62. The apparatus is then powered-up at which time a PHRUP signal is momentarily sent from display/reset unit 80 to control/dialer unit 70, and the apparatus is ready for operation.

Normally, the contacts of master line relay 33 are closed. Therefore, master line interface connector 31 is connected to ring detector 39 by relay 33. When an incoming ring signal is detected, ring detector 39 activates ring extender/timer 38 through opto-isolator 32. Timer 38 produces two signals, designated LATEN (latch enable) (line 1 of FIG. 10) and RINGTIM (line 2 of FIG. 10), which have the effect of extending the duration of the incoming ring signals, and each of which will time out 4.76 seconds after the last ring signal is received from the central office. The/RINGTIM signal is provided to an input of logic unit 71 (FIG. 7) as well as to ring detect visual indicator 83 on FIG. 8. As shown of FIG. 6, the LATEN signal is sent to inputs on each of line status flip-flops 61a–h to remove the reset condition from each of line status flip-flops 61a–h.

When a user at the subscriber location hears the ring or visualizes it on ring detect indicator 83, the user selects an unused slave line by memos of a conventional key telephone set which is operatively connected to each slave line interface circuit 40a–h. Assuming that the selected slave line is line 1 on FIG. 4a, slave line interface circuit 40a generates and sends an INUSE1 signal (line 3 of FIG. 10) to buffer 63 of line status unit 60 (FIG. 6) which, in turn, sends a BINUSE1 signal to line status flip-flop 61a. This, in turn, then generates a/HOOK1 signal (line 4 of FIG. 10) for use by gate 67 of FIG. 6 and by slave line relay buffers 44a and 44b, thereby activating slave line relay 43. Gate 67, upon receiving the/HOOK1 signal, sends a HOLD signal (line 5 of FIG. 10) to programmable logic unit 71 of FIG. 7.

Logic unit 71 is programmed in a conventional manner, as more specifically disclosed in FIG. 11, to begin a sequence of events following generation of the HOLD signal. A/HOLD signal is sent to each of line status flip-flops 61a–h to lock them in their present state, insuring that only the then selected first slave line can be connected to transformer 73 during the next sequence of events. Subsequently, the state counter shown on FIG. 7, comprising timer 74a and 74b, counter 75, and state counter flip-flop 76 is activated, sending a sequence of state strings (STATE0 through STATE24 on FIGS. 11, and 12, and lines 6, 7, 8, and 9 of FIG. 10), each sent approximately 57 ms apart, to logic unit 71 which are then used by logic unit 71 to implement the sequence of operations described herein and shown on FIGS. 10, 11, and 12. The timing of the state counter is illustrated on FIG. 7 and lines 10, 11, and 12 of FIG. 10, as signals COUNT,/TIMEX, and TIMER.

Logic unit 71 sends a dial enable (DIALEN) signal (line 16 of FIG. 10) to dialer 72, resulting in the dialing of the *8 (or other preprogrammed characters), to the local phone company central office. The local phone company central office, in turn, uses these dialed characters in its Prestige or similar call intercept service to move the incoming call off of the master line to the selected slave line and disconnecting the master line to await the next call. One of the functions of the state counter is to allow for line settling and central office response delays in cooperation with the operation of the present invention.

After dialer 72 completes dialing, a/DISCHAR signal (line 13 of FIG. 10) is sent by logic unit 71 to reset timer 87 which, in turn, sends a reset (/RESET) signal (line 14 of FIG. 10) to timer 74b, ring extender/timer 38, and flip-flop 76. The/RESET signal is also sent to logic unit 71, where it is inverted and, as signal RSTHI (line 15 of FIG. 10), used to reset counter 75. If desired, the apparatus can be manually reset during troubleshooting or testing by use of internally mounted reset switch 86.

In addition to the operations previously described, the signal/INUSE1 generated by slave line interface circuit 40a, as well as/INUSE signals from other off-hook slave lines, are combined with the settings on slave line disable switch 62 in buffer 63 and then sent to first stage slave line status detector 64. As can be seen by reference to FIG. 6, if all slave lines are in use, there will be signals generated at each input of first stage slave line status detectors 64, 65, and 66, resulting in activation of each of signals BUSY 1, BUSY2, and BUSY3 to logic unit 71. As a result, logic unit 71 generates a signal called/OFFHOOK (line 17 of FIG. 10). The OFFHOOK signal, as seen in FIG. 3, drives master line relay 33 through relay drivers 36a and 36b, connecting the master line to transformer 73 via signaling line 37. Approximately 1.5 seconds later, dialer 72 is activated to dial *8, and the master line then remains off-hook until one of the slave lines again becomes free. Also, if there is an incoming call in process when the last available slave line goes off-hook, the/OFFHOOK signal is inhibited by logic unit 71 until the slave line process is complete. Then the master line will be allowed to go off-hook and dialing is enabled as before.

As can be seen by reference to the drawings, the operations described above are repeated for each incoming call on the master line, with the apparatus of the present invention constantly seeking and selecting the next available slave line to go off-hook by the user.

Figure 10:
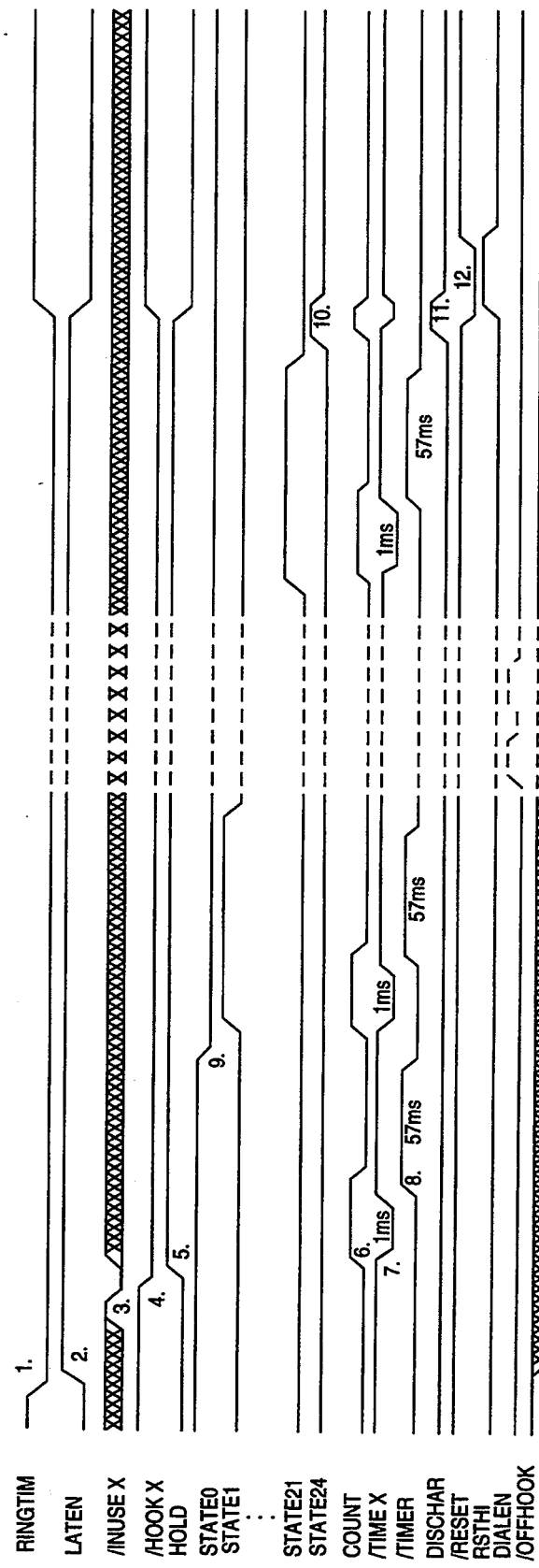
FIG. 10 is a diagram showing the timing relationship among the various status, timer, detector, and signalling lines and process steps of the present invention.

FIG. 10 shows in more specific detail the timing relationship among the various state indicators and signals following ring detection. Point 1 on the first line of FIG. 10 indicates the beginning of ring detection by ring detector 39 (FIG. 3) whereby the/RINGTIM signal from ring extender 38 is activated (RINGTIM goes low). This is followed at point 2 by generation of the LATEN signal by ring extender 38 causing the apparatus to wait for the next slave line to go off hook. Point 3 on the third line shows the/INUSE signal from one of slave line interface units 40a–g (INUSE signal goes low), indicating the point where a slave line is picked up, thereby going off hook. Point 4 on line 4 of FIG. 10 indicates the connection by corresponding slave line relay 43 into the incoming line, signified by activation of the/HOOK signal (from slave line status unit 60) (HOOK signal going low). Point 5 on line 5 represents the point at which the HOLD signal from logic unit 71 goes high, locking line status flip-flops 61a–h to prevent further line changes. Point 6 on the tenth line of FIG. 10 indicates the start of the state counter, shown in FIG. 7. Point 7 on the eleventh line of FIG. 10 shows generation of a trigger signal (/TIMEX) at state timers 74a and 74b. Point 8 on the twelfth line of FIG. 10 shows activation of timers 74a and 74b of the state counter. Point 9 on the sixth line of FIG. 10 shows activation of the first state of the state counter followed by point 10 on line 7, indicating triggering at state 24 of the state counter of the signal/DISCHAR. Point 11 on line 13 of FIG. 10 indicates triggering of reset timer 87 and point 12 on line 14 of FIG. 10 shows generation of the/RESET signal by reset timer 87 to reset the entire apparatus.

Referring now to FIG. 11, the sequence of states counted by the state counter of control/logic unit 70 is shown, with each state represented as a string of data bits Q0, Q1, Q2, and Q3 from counter 75, and Q4 from flip-flop 76. An ALLBUSY string is generated by logic unit 71 by the logical product of BUSY1, BUSY2, and BUSY3 signals from first stage slave line status detector gates 64, 65, 66.

FIG. 12 provides the logical state equations which are pre-programmed and used to control the operations of logic unit 71 of the preferred embodiment, at each state established by the state counter. Accordingly, each COUNT output of logic unit 71 (FIG. 7) corresponds to one of the data strings shown on FIG. 11, sequentially incremented by the/TIMER signal. The other outputs of logic unit 71 shown on FIG. 7 (DATA, DIALEN,/DISCHAR, OFFHOOK, /HOLD, and RSTHI) are represented on FIG. 12 as pre-programmed logical products of various input signals.

Although a variety of conventional integrated circuits and components can be used in the apparatus of the present invention, in one preferred embodiment all telephone lines are terminated with Suttle 635A eight position shorting jacks for interconnect 52. Opto-isolators 32 and 42 are model HI1AA 1 devices from Motorola. Line interface relays 33 and 43 are Omron types G6A-234P-ST-US-DC5. Line coupling transformer 73 is a Prem Magnetic model SPT-020. Ring detector 39 is a MC34017-1P from Motorola. Timers 38, 74a, 74b, and 87 are types 74HCT4538 from Harris. Flip-flops 61a–h and 76 are industry standard type 74LS76. Buffer 63 is an industry standard type 74LS244. First stage line status detectors 64, 65, and 66 are industry standard types 74ALS27. Hold gate 67 is a industry standard type 74LS30. Counter 75 is an industry standard type 74LS93. Dialer 72 is a conventional DTMF tone generator, type TP5088 from National Semiconductor. Programmable arithmetic logic unit 71 is a type PALCE20V8 from AMD. Relay drivers 36a and 36b and 44a and 44b are type 7407 operational amplifiers.

What is claimed is:

1. A telephone line hunting and call intercept apparatus comprising:
   a. a subscriber master line interface to a master telephone line connecting a telephone company central office to a subscriber location;
   b. a subscriber slave line interface to each of a plurality of slave telephone lines at said subscriber location, said subscriber slave line interface responsive to an off-hook signal generated by a telephone set connected to said slave telephone lines at said subscriber location;
   c. ring detector means for detecting a ring signal generated at said subscriber location on said master telephone line;
   d. a line status signaling unit operatively connected to said subscriber master line interface and to said subscriber slave line interface, said line status signaling unit responsive to signals from said ring detector means and to off-hook signals from said subscriber slave line interface;
   e. a logic control unit operatively connected to said subscriber master line interface, to said subscriber slave line interface, and to said line status signaling unit;
   f. intercept means, responsive to said logic control unit, to connect an incoming call on said master telephone line to one of said slave telephone lines selected by a user at said subscriber location; and
   g. automatic dialing means operatively connected to and responsive to said logic unit for dialing a preprogrammed line intercept code across said slave telephone line selected by said user to a call intercept system at said telephone company central office, whereby, in response to receiving said preprogrammed line intercept code dialed by said automatic dealing means, said call intercept system at said telephone company central office moves said incoming call at said telephone company central office off said master telephone line to said slave telephone line selected by said user, thereby freeing up said master telephone line to receive another call.

2. The apparatus of claim 1 further comprising means to take said master telephone line off-hook while all of said slave telephone lines are off-hook.

3. The apparatus of claim 1 further comprising switch means for manually disabling said slave telephone lines.

4. A method, used in conjunction with a call intercept system at a telephone company central office, for moving incoming calls on a master telephone line at a subscriber location to one of plural slave telephone lines at said subscriber location, said method comprising the steps of:
   a. detecting at said subscriber location a ring signal on said master telephone line, said ring signal corresponding to an incoming call;
   b. detecting at said subscriber location an off-hook status signal generated by one of said slave telephone lines manually taken off-hook by a user at said subscriber location following detection of said ring signal on said master telephone line;
   c. automatically assigning said incoming call on said master telephone line to said slave telephone line taken off-hook; and
   d. automatically dialing across said slave telephone line taken off-hook a preprogrammed intercept code from said subscriber location to said telephone company central office, whereby said call intercept system will use said intercept code to move said incoming call off said master telephone line to said slave telephone line taken off-hook, whereby said master telephone line is freed up to accept another call.

5. The method of claim 4 further comprising the step of monitoring the off-hook status of each of said slave telephone lines and taking said master telephone line off-hook while all of said slave telephone lines are off-hook.

* * * * *